United States Patent
Freeman

(10) Patent No.: US 6,606,142 B2
(45) Date of Patent: Aug. 12, 2003

(54) ELECTROOPTICAL DISPLAYS WITH POLYMER LOCALIZED IN VICINITIES OF SUBSTRATE SPACERS

(75) Inventor: Gary A. Freeman, Newton, MA (US)

(73) Assignee: Viztec, Inc., Tampa, FL (US)

( * ) Notice: Subject to any disclaimer, the term of this patent is extended or adjusted under 35 U.S.C. 154(b) by 158 days.

(21) Appl. No.: 09/882,310

(22) Filed: Jun. 15, 2001

(65) Prior Publication Data
US 2002/0109816 A1 Aug. 15, 2002

Related U.S. Application Data
(60) Provisional application No. 60/268,176, filed on Feb. 12, 2001.

(51) Int. Cl.$^7$ .............................................. G02F 1/1339
(52) U.S. Cl. ........................................ 349/155; 349/156
(58) Field of Search ................................ 349/156, 157, 349/187

(56) References Cited

U.S. PATENT DOCUMENTS

| | | | |
|---|---|---|---|
| 4,001,140 A | 1/1977 | Foris et al. ................. 252/316 |
| 4,249,800 A | 2/1981 | Spruijt | |
| 4,331,795 A | 5/1982 | Ukita et al. ................. 526/273 |
| 4,678,284 A | 7/1987 | Tashiro ........................ 350/344 |
| 4,688,900 A | 8/1987 | Doane et al. ........... 350/347 V |
| 5,130,831 A | 7/1992 | Kohara et al. ................. 359/81 |
| 5,285,304 A | 2/1994 | Hotta et al. | |
| 5,321,533 A | 6/1994 | Kumar ........................ 359/51 |
| 5,327,271 A | 7/1994 | Takeuchi et al. .............. 359/75 |
| 5,333,074 A | 7/1994 | Hikmet ......................... 359/51 |
| 5,434,685 A | 7/1995 | Pirs et al. ...................... 359/51 |
| 5,473,450 A | 12/1995 | Yamada et al. ................. 359/51 |
| 5,474,629 A | 12/1995 | Yamazaki et al. | |
| 5,494,604 A | 2/1996 | Chung | |
| 5,504,600 A | 4/1996 | Pirs et al. ...................... 359/51 |
| 5,530,566 A | 6/1996 | Kumar ........................ 359/51 |
| 5,581,384 A | 12/1996 | Hotta et al. .................. 349/155 |
| 5,583,672 A | 12/1996 | Kim ............................. 349/92 |
| 5,612,803 A | 3/1997 | Yamada et al. .............. 349/188 |
| 5,729,312 A | 3/1998 | Yamagishi et al. ........... 349/89 |
| 5,739,882 A | 4/1998 | Shimizu et al. | |
| 5,812,232 A | 9/1998 | Shiroto et al. .............. 349/157 |
| 5,940,156 A | 8/1999 | Nishiguchi et al. ......... 349/156 |
| 5,949,508 A | 9/1999 | Kumar et al. ............... 349/122 |
| 6,004,423 A | 12/1999 | Ruedin et al. .............. 156/292 |
| 6,019,284 A | 2/2000 | Freeman et al. ............. 235/380 |
| 6,049,366 A | 4/2000 | Hakemi et al. ............... 349/86 |
| 6,078,378 A | 6/2000 | Lu et al. ..................... 349/155 |
| 6,128,056 A | 10/2000 | Kubota et al. ................ 349/86 |
| 6,226,067 B1 | 5/2001 | Nishiguchi et al. | |

Primary Examiner—Kenneth Parker
(74) Attorney, Agent, or Firm—Fish & Richardson P.C.

(57) ABSTRACT

There is a liquid crystal display device with two substrates facing and spaced from each other, at least one of the substrates being transparent. Electrodes are positioned to establish an electric field in the space between the two substrates. One or more space elements are located between the substrates. One or more polymer supports are located primarily in the vicinities of the spacer elements. The polymer supports extend between the two substrates and have been polymerized in situ in response to polymerization initiating or enhancing (PIE) material carried on or within the spacer elements. Electrooptic material (e.g., liquid crystal) fills at least a portion of the space between the two substrates.

39 Claims, 4 Drawing Sheets

ELECTROOPTICAL DISPLAYS WITH POLYMER LOCALIZED IN VICINITIES OF SUBSTRATE SPACERS

CROSS-REFERENCE TO RELATED APPLICATION

This application claims priority from U.S. Provisional Application Ser. No. 60/268,176, filed on Feb. 12, 2001.

BACKGROUND OF THE INVENTION

This invention relates to liquid crystal and other electronic displays.

Commercially, it is highly desirable for an electronic display to be as thin and light as possible while still maintaining a high degree of ruggedness and imperviousness to forces that are a consequence of shock and drop. In the area of mobile electronics, such as cell phones and personal digital assistants (PDAs), size and weight are critical factors to the commercial success of a product, but currently breakage of the displays within these devices remains the primary cause of repairs and product returns. In addition, the need for electronic displays that can actually be bent has been acknowledged in several areas: so-called 'electronic paper' in which fiber paper is replaced with a display would be much more compelling as a product if the electronic display could be rolled up or folded like traditional paper; wearable electronics such as computers or multifunction watches would be much more comfortable to the wearer if the display were to conform to the user's body; chip cards which have strict flexure life-test performance standards would be able to incorporate flexible displays and still conform to those standards. Replacement of the glass substrates within displays with plastic film has been an area of active research within the display community for a number of years.

Electrophoretic displays achieve images via electrophoretics—the rapid migration of microparticles in colloidal suspensions. Light scattering particles are moved within a dyed colloidal suspension by electrostatic forces. The particles will either move toward the viewer, in which case, the typically white particles are seen by the viewer, or to the surface away from the viewer, in which case, the white particles will be hidden by the dark dye.

Cholesteric displays are another display technology being attempted on plastic substrates. When sandwiched between conducting electrodes, cholesteric liquid-crystal material can be switched between two stable states—the so-called focal conic and planar states—in which the liquid crystal's helical structures have different orientations. In the focal conic state, the helical structures are unaligned and the liquid crystal is transparent. In the planar state, the helical structures' axes are all perpendicular to the display's surface resulting in essentially monochromatic transmission by the display.

The Gyricon display being developed by Xerox, is made of microscopic beads, randomly dispersed and held in place between two plastic sheets by a flexible elastomeric matrix of oil-filled cavities. The balls have strongly contrasting hemispheres, black on one side and white on the other. The white side is highly reflective, while the black side absorbs light. Each hemisphere has a unique intrinsic charge, resulting in a force on the ball when an electric field is applied and the axis of the ball isn't aligned with the field. The side of the ball presented for display depends on the polarity of the voltage applied to the electrode. In all three of these cases, while they have some positive features such as high contrast and compatibility with plastic substrates, they all currently high drive voltages, have slow response times, and are not compatible with commercially available drive electronics.

Liquid crystal displays (LCDs) are attractive because of the low drive voltages required to switch them, their relatively fast response times, the wide availability of drive electronics, and the significant intellectual and manufacturing investment in the technology. Attempts have been made to develop LCDs that intermixed the liquid crystal within a polymer matrix in order to make them compatible with plastic substrates, one example being polymer dispersed displays (PDLCDs). PDLCDs are fabricated by intermixing the liquid crystal and a pre-polymer into a solution prior to assembling the display. After assembling the display, the polymer is cured, typically by ultraviolet light. During the polymerization the LC separates out from the polymer into microscopic droplets. Since the droplets of LC are not in contact with any alignment layer, the orientation of the molecules is random and light is scattered by the droplets. Applying a voltage to the electrodes of the PDLCD causes the LC molecules to become aligned, resulting in the display becoming transparent. Like the other flexible displays, PDLCDs required high drive voltages not generally compatible with existing drive electronics. Prior art such as U.S. Pat. Nos. 4,688,900, 5,321,533, 5,327,271, 5,434,685, 5,504,600, 5,530,566, 5,583,672, 5,949,508, 5,333,074, and 5,473,450 all make use of phase separation of an LC/polymer mixture during polymerization of the polymer using light as the curing mechanism (photopolymerization).

Methods have been developed to achieve anisotropically dispersed LC/polymer structures which might have drive voltages lower then those achieved in PDLCDs. U.S. Pat. No. 5,949,508 describes a method in which a lamellar structure is achieved whereby the LC and polymer are disposed on opposite substrates; this reduces the drive voltages necessary to switch the device, but results in a structure where it is only practical to have the rubbed alignment surface on one of the substrates. While this structure is effective with nematic or electrically controlled birefringence (ECB) displays, it becomes more difficult to construct displays such as twisted nematic (TN) and super twisted nematic (STN) which typically require alignment surfaces on both substrates. U.S. Pat. Nos. 5,473,450 and 5,333,074 describe methods of localizing the polymer during photopolymerization by exposing only portions of the device to the light source using masks. Polymer structures of a size on the order of a pixel (~0.3 mm) are achievable, but manufacturing may be more difficult since the photomask must generally be aligned to the electrode structure within the device and expensive collimated UV light sources must generally be employed. Structures much smaller than 0.3 mm may be difficult to achieve due to the inherent scattering of the LC/polymer mixture. U.S. Pat. No. 5,473,450 teaches the patterning of photoinitiator onto the alignment layer, but this method generally requires a highly accurate, screened deposition of the chemical photoinitiator onto the substrates. Proper alignment of the silk-screening mask to the clear ITO electrodes may be difficult to achieve, and the introduction of chemicals directly onto the polyimide alignment surface may result in poor alignment of the LC to the alignment surface, poor appearance of the display and lower manufacturing yields.

In addition to the breakage problems due to shock and drop, glass substrate displays also have difficulty surviving extremes of temperature. When the temperature of a display is cycled between cold and hot it will sometimes develop small voids between the spacers and the liquid crystal fluid.

While the voids are small in size, they typically are noticeable enough that the display will be returned for repair. The voids are due to the mismatch in the thermal coefficients of expansion between the LC and the typically glass or plastic spacers. When a glass substrate display is assembled at room temperature and then sealed, its volume is essentially fixed at that point. As the display is cooled down, both the LC and spacer material will contract but due to the mismatch in the thermal coefficients of expansion and the mechanical discontinuity at the spacers, stress is localized around the spacers and voids develop. Initially, the voids are small areas of vacuum or very low pressure, but the more volatile components of the LC quickly move to a gaseous phase to fill the void to achieve a lower energy equilibrium state. When the display is returned to room temperature, the vapor filling the voids prevents the voids from being absorbed back into the LC, and the damage is typically permanent. Display manufactures have solved this problem by, amongst other methods, utilizing specially fabricated spacers that have a softer, more compliant exterior coating surrounding a core of either glass or plastic. The outer compliant layer acts to relieve the stresses encountered during thermal cycling of the display, thus preventing the voids. Because of the difficulty of manufacturing these spacers, they are often 10–20 times more expensive than regular spacers and so are often used only when absolutely necessary.

SUMMARY OF THE INVENTION

In general, the invention features a liquid crystal display device comprising two substrates facing and spaced from each other, at least one of the substrates being transparent, electrodes positioned to establish an electric field in the space between the two substrates, one or more space elements located between the substrates, polymer supports located primarily in the vicinities of the spacer elements, the polymer supports extending between the two substrates and having been polymerized in situ in response to polymerization initiating or enhancing (PIE) material carried on or within the spacer elements, and electrooptic material filling at least a portion of the space between the two substrates.

In preferred implementations, one or more of the following features may be incorporated. The spacer elements may comprise a large number of generally spherical or cylindrical elements. The spacer elements may comprise glass. The glass may be etched and the PIE material may adhere to the etched glass surface. The spacer elements may comprise plastic. The plastic may be porous and the PIE material may absorbed into the porous structure. The spacer elements may comprise high-surface area particles that are nanoporous, mesoporous, or microporous. The spacer elements may be randomly located in the space between the substrates. The majority of the polymer supports may be bonded to each of the two substrates. The polymer support may generally surround the exterior of the spacer element. The polymer supports may be primarily separate members not interconnected with one another. One or more interconnecting regions of polymer may interconnect a majority of the polymer supports. One of the interconnecting regions may comprise a layer of polymer adjacent one of the substrates. The PIE material may be applied to the spacers before introduction of the spacers to the space between the substrates. The PIE material may be applied to the spacers after introduction of the PIE elements to the space between the substrates. The PIE material may be a coating applied to the spacers. The spacers may be dry sprayed on to the substrate before application of the electrooptic material. The spacers may also be wet sprayed on to the substrate. A solvent used for wet spraying may comprise a PIE material or may have a PIE material in solution or suspension. The PIE material may comprise one or both of the following: an initiator and an accelerant of the in situ polymerization process. The PIE material may be light activated. The PIE material may comprise a photoinitiator. The photoinitiator may comprise a plurality of photoinitiators of different spectral sensitivities, so that polymerization may be initiated at different times in different locations. The light may be ultraviolet light. The PIE material may be heat activated. The PIE material may be self-activated after a period of time following assembly of the display. The PIE material may comprise both a photoinitiator and an accelerant. The electrooptic material and a prepolymer may be applied between the substrates as a mixture, and during in situ polymerization a phase separation of the electrooptic material and the polymer may occur. The electrooptic material may be a liquid crystal material. The electrooptic material may be a mesomorphic material. The liquid crystal display device may further include at least one electrode on at least one substrate to generate the electric field. The liquid crystal display device may further include at least one electrode on the second substrate. The polymer used for in situ polymerization of the substrates may comprise an acrylic based adhesive. The polymer used for in situ polymerization of the substrates may comprise an epoxy-based adhesive. The polymer used for in situ polymerization of the substrates may comprise a urethane-based adhesive. The polymer used may be primarily cured by light. The polymer used may be primarily cured by heat. The polymer used may be primarily cured via intermixing of a chemical additive.

The invention provides a display with the low drive voltages of currently-manufactured LC-only displays. It does not generally require the use of complex processing steps such as the use of photomasks. The polymer structures can, if desired, be self-aligning to features within the display. Embodiments can be made using methods that are compatible with existing LCD manufacturing methods.

The invention provides displays that are simple, manufacturable, and that are capable of achieving polymer microstructures that are self-aligned (i.e., no photomask required) and localized to within less than about 5 $\mu$m. Additional benefits include the adhesion to the substrates of the spacing elements used to maintain the proper distance between the substrates. This is important since millions of these microscopic spacers may be distributed between the substrates of any of the aforementioned display technologies, and the spacers will have a tendency to shift upon flexure of the display or when the display is squeezed. Other benefits include the ability to optimize the laminate structure of the plastic display to provide good performance under compression as well as peel strength. This last benefit is achieved as a result of the polymer being localized around and surrounding the spacers; the spacers provide compressive strength while the polymer provides the peel and shear strength.

Other features and advantages of the invention will be apparent from the following detailed description and from the claims, and from the disclosure and claims of my applications entitled, "Electrooptical Displays Constructed with Polymerization Initiating and Enhancing Elements Positioned Between Substrates," "Electrooptical Displays with Multilayer Structure Achieved by Varying Rates of Polymerization and/or Phase Separation," and "Electrooptical Displays Constructed with Polymer-Coated Elements Positioned Between Substrates," each filed on even date herewith (and incorporated herein by reference).

DETAILED DESCRIPTION OF THE INVENTION

Figure 1:
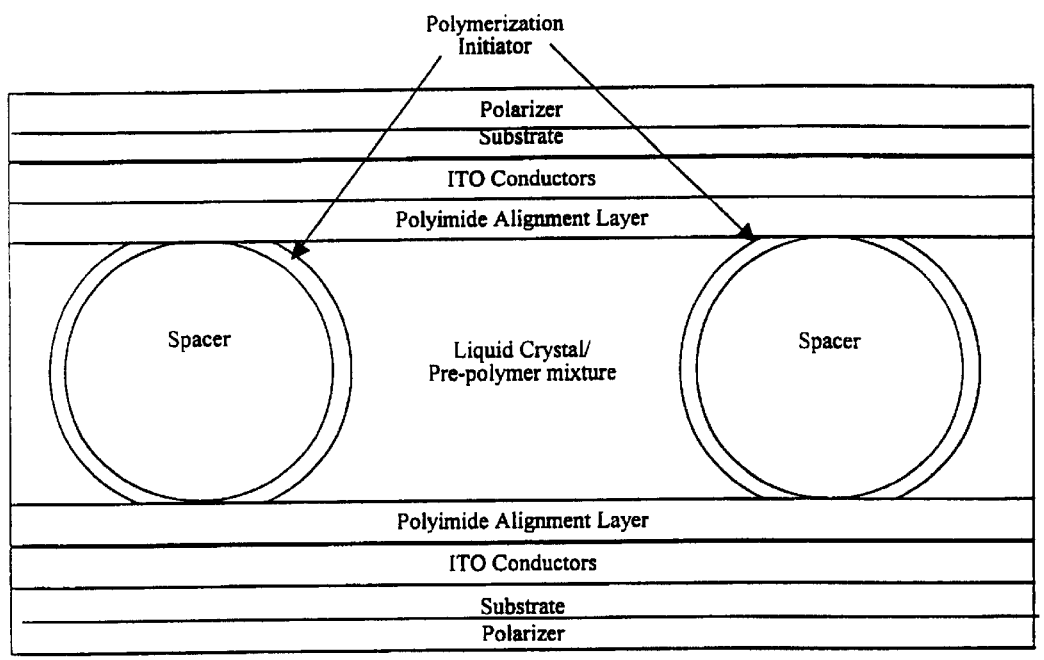
FIG. 1 shows a cross section of a liquid crystal display device that uses spherical spacers coated with a photoinitiator prior to exposure to the developing light.
Figure 2:
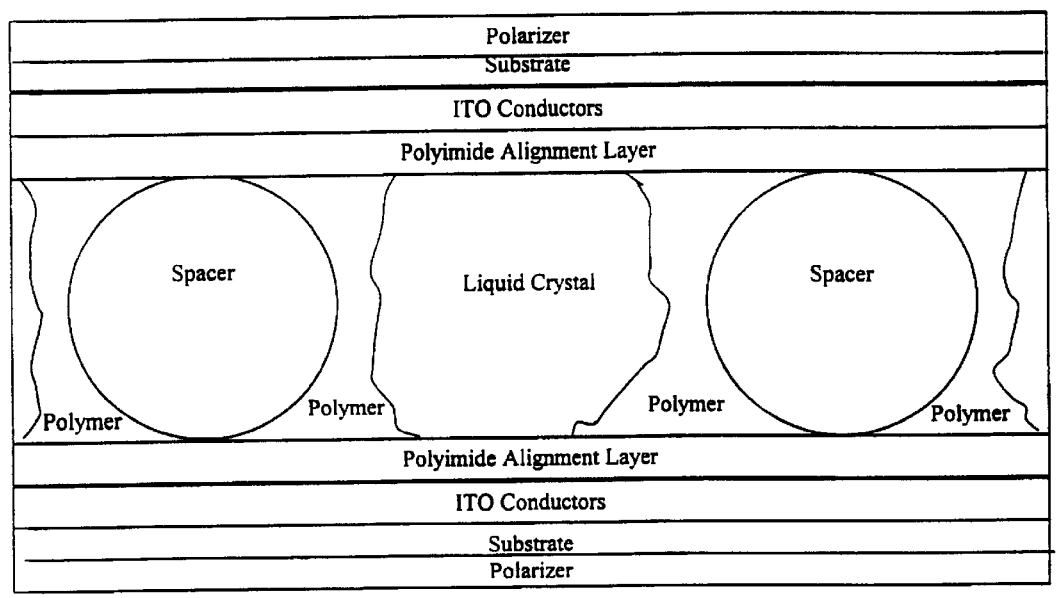
FIG. 2 shows a cross section of a liquid crystal display device that uses spherical spacers coated with a photoinitiator after exposure to the developing light.

According to the present invention, in the preferred embodiment, a liquid crystal display device is assembled using the following procedure:

1. The substrates are a flexible polymer material with a low level of birefringence to improve the optical qualities of the final product and having a glass transition temperature greater than 150 degrees C in order to facilitate the various drying and baking operations. A polymer that meets these requirements is poly ether sulphone (PES). A vapor barrier is coated onto the outside surface of the substrate to improve the reliability and product life of the display; the vapor barrier is typically composed of a thin film laminate structure of silicon oxide and another polymer.
2. The substrates are coated with a vacuum-deposited layer of typically indium tin oxide (ITO), which is a transparent conductor. The ITO is then patterned via chemical, electron beam, or laser etching.
3. A mixture is prepared of approximately 10% photoinitiated pre-polymer such as Norland Products NOA-65 and 90% liquid crystal such as Merck E7. The prepolymer formulation has been modified such that all photoinitiator has been removed from the formulation.
4. A polyimide solution is coated onto the ITO side of at least one of the substrates and baked at a temperature of 150 degrees C for one hour. The polyimide surface (s) are then rubbed to develop an alignment layer for the liquid crystal.
5. Glass spacers of a diameter of 3–3.5 μm are surface-etched using a 1.25% solution of hydrofluoric acid for 10 minutes while suspended in solution in an ultrasonic vibration tank. After washing, the etched spacers are then coated with a mixture of methacrylate silane and a photoinitiator by immersing the spacers into a solution containing the initiator and an adhesion promoter such as a silane and then spraying the spacers into the top of a vertical drying column onto the substrate(s). Silanes improve the bonding between glass and polymers via chemical bonding at the silane/glass interface and a dispersion of the polymer into the silane at the silane/polymer interface.
6. Spacers are deposited onto the substrate surface in large numbers (with a density of at least about 30 spacers/mm$^2$). The spacers tend to be distributed generally randomly across the substrate surface.
7. The LC/prepolymer mixture is deposited in sufficient quantity onto both inner faces of the substrates, and the substrates are laminated together while maintaining the proper alignment between the ITO patterns on the upper and lower substrates.
8. Both sides of the cell are then exposed to UV light that causes scission of the photoinitiator and release of free radicals around the spacers. The polymerization reaction will then proceed with the initiation sites centered around each spacer that was deposited with the initiator.
9. The rate of polymerization is set at the beginning of the process by adjusting the UV intensity, while the rate of diffusion of the LC and pre-polymer is changed by adjusting the reaction temperature. Diffusion rates can also be controlled via the pre-polymer viscosity as well as by the choice of the LC and pre-polymer to achieve the appropriate degree of miscibility of the two liquids. By adjusting the diffusion and reaction rates, the resulting LC/polymer structure can provide the desired morphology. For full phase separation, temperatures should be in excess of 45 degrees C with a pre-polymer viscosity less than 1000 cps.

The resulting display is quite flexible. It can be flexed without permanent damage by at least the amount of flexing specified in the flexing tests described in U.S. Pat. No. 6,019,284, hereby incorporated by reference.

It is not necessary that polymer form in the vicinity of each spacer, nor that the polymer extend fully from one substrate to another in all cases. Some spacers, for example, may not have been coated with PIE material, or they may have been imperfectly coated.

Polymer supports that do not extend fully from one substrate to the other may still be of benefit in creating isolated regions of liquid crystal, and thereby make possible improved bistability of certain ferroelectric liquid crystal materials, which may exhibit improved bistability if the liquid crystal layer is divided into discrete droplets along one substrate.

In an alternative embodiment the polymerization initiator is not activated by light but rather is the 'accelerator lacquer' type. When using the an accelerator lacquer initiator, coating of the spacers is accomplished via the method as previously described, but the polymerization begins to occur automatically at some time after the LC/polymer mixture is brought into contact with the initiator-coated spacers. Lamination is performed at room temperature in order to lengthen the time before cure begins. After lamination has been completed, the temperature is raised in order to increase the diffusivity of the LC and prepolymer. In addition, the aromatic amines in the pre-polymer formulation and the peroxide in the lacquer are chosen so as to provide the correct free radical generation rate which, when combined with the diffusion rates of the pre-polymer and LC and the spacings within the display region, result in the polymer localized to the region surrounding the spacers.

Figure 3:
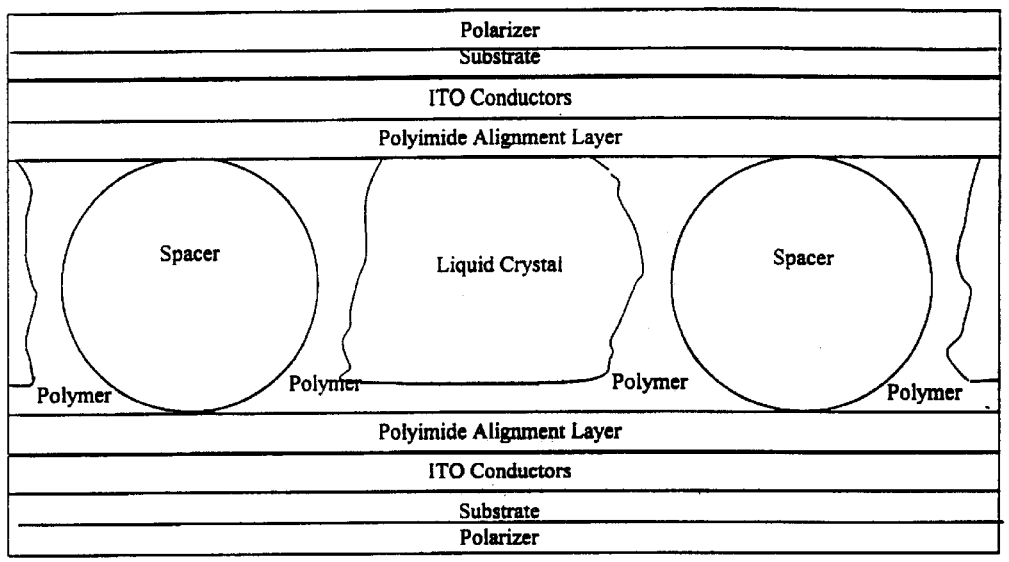
FIG. 3 shows a cross section of a liquid crystal display device that uses spherical spacers coated with a accelerator after polymerization and exposure to the developing light.
Figure 4:
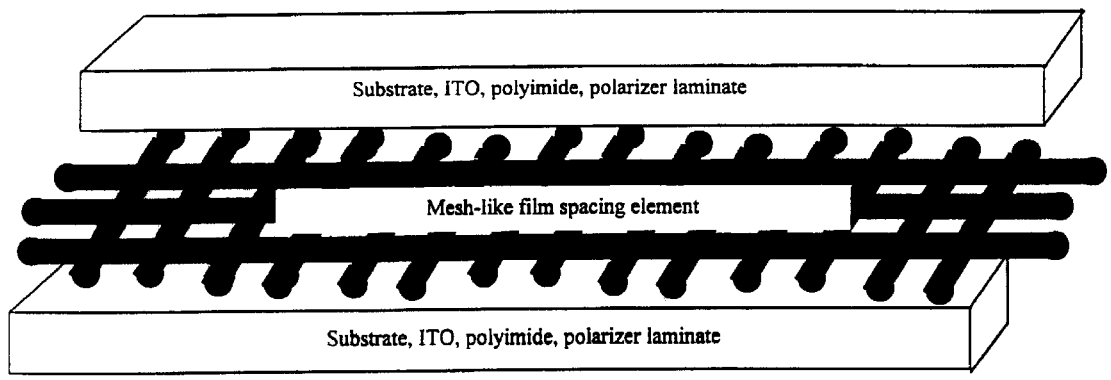
FIG. 4 shows a cross section of a liquid crystal display device that uses a mesh-like spacing membrane.

In another embodiment, the pre-polymer formulation retains its photoinitiator component but the spacers are still coated with an adhesion promoter such as a silane coating along with an accelerant or additional photoinitiator. Typical active ingredients in the accelerant would be a tertiary amine like dimethyl amino benzene. The curing in this case will be initiated by both the accelerant and the light. The accelerant reaction is allowed to proceed for a sufficient period of time to localize most of the polymer around the spacers. The light source is then turned on on only one side, resulting in a deposition of any of the remaining polymer along the substrate closest to the light source as shown in FIG. 3. This particular embodiment can be further refined by using liquid crystals capable of bistability, i.e., the ability to maintain two or more electrooptic states without any electric field being present. Some examples of such a bistable or multistable liquid crystal are those of the ferroelectric or antiferroelectric type. In a further refinement, the reaction rate is varied during the course of polymerization to create a structure in which liquid crystal droplets interspersed in the polymer are created on the alignment surface nearest to the light source and a thin layer of the liquid crystal is created on the alignment surface opposite the light source as shown in FIG. 4. Both surfaces are aligned in such a configuration so as to produce alignment of the LC molecules on both surfaces, but droplet-encapsulated LC are known to be a more durable structure in terms of maintaining bistability.

One possible polymer are acrylic adhesives which have excellent optical clarity as well as the availability of a wide selection of manufactured optical grade versions of the material. Other polymers that might also be used are, for instance, epoxies or urethanes, though typically these classes of polymers do not have the optical properties equal to those of the acrylics. Acrylic adhesives are reactive cross-linking structural adhesives that cure by means of free-radical initiation. They are based on the methacrylate monomers and cure by addition polymerization. The formation of free radicals initiates a sudden and rapid chain reaction and curing of the adhesive. Condensation polymerization, on the other hand, typified by urethane and epoxies, proceeds at an approximately constant, usually lower reaction rate. Generation of free radicals for initiation of polymerization of acrylic based adhesives can be accomplished by a redox reaction such as that involving dimethyl aniline and peroxide. Because of the nature of the chain reaction, the free radicals can propagate from monomer to monomer and the cure itself can propagate up to 2.5 mm from the point of polymerization initiation. As a result of this cure propagation phenomenon, the accelerator and monomer do not have to be fully intermixed to achieve a full cure. This leads to several other methods for curing, where the accelerator can be in the form of a lacquer or thin layer on one surface allowing for the priming and storing of parts. In another related cure method termed 'honeymoon' or 'no-mix' in industry parlance, a two part adhesive is used which when brought into contact with each other (without any intermixing necessary) will result in the generation of sufficient free radicals to fully polymerize all the material.

Acrylics can also be cured by exposure to ultraviolet light less than 400 nm in wavelength, and in some instances by light in the visible range as well. In the case of photocurable adhesives, the free radical source is termed a photoinitiator and results in the formation of free radicals on exposure to light. Compounds which act as photoinitiators with light in the range of 200–300 nm are benzoine ethers, activated benzophenones and related compounds; benzyl dialkyl amino morpholinyl ketone is an example of a visible wavelength-activated photoinitiator. Photoinitiators are disassociated into segments forming free radicals by light in a process known as scission. One example of an equal mix curing system is embodied in U.S. Pat. No. 4,331,795 which uses a cobalt salt accelerator in one component and a hydroperoxide in the other element. Epoxies may also be formulated that can be UV-cured via cationic polymerization by incorporating reactive diluents and cyclic monomers. UV-initiated cationic curing of urethanes may be accomplished, for instance, by basing the formation on vinyl ether and polyurethane oligomers such as that manufactured by Allied Signal Inc.

A great variety of embodiments of the invention may be practiced. The PIE material may supply a constituent component of the pre-polymer that is essential to the initiation of curing but that is left out of the LC/pre-polymer mixture. That essential constituent is part of the PIE material and is deposited at one or more of the desired spacing elements within the display region, thus ensuring that initiation and cure will proceed from the desired locations only. The just-mentioned essential constituent component may be a photoinitiator which is activated when exposed to either UV or visible light via scission. The rate of photopolymerization may be controlled by adjusting the intensity of the light source. The rate of diffusion of the phase separation process may be controlled by adjusting the temperature at which the reaction occurs. The rate of the photopolymerization may be varied during the course of the polymerization process in order to create multilayer, composite polymer/LC structures. The rate of the phase separation may be controlled by adjusting the miscibility of the LC and the pre-polymer. The rate of the phase separation may be controlled by adjusting the absolute and relative viscosities of the LC and the pre-polymer. Tthe spacer elements may be coated with an accelerator lacquer or photoinitiator prior to device assembly and then dry-spray deposited onto one or more of the substrates. The spacer elements may be deposited via a wet-spray method in which the solution used as the deposition vehicle is either strictly composed of an accelerator or photoinitiator, or includes either or both of these compounds and a solvent, the concentration of which is adjusted to achieve the appropriate quantity of material to fully polymerize the pre-polymer within the display region around the spacers. The spacers may be mixed into a solution of the accelerator or photoinitiator. The solution is then dispensed in liquid form, via a method such as a pipette, silk screen or syringe, directly onto macroscopic regions on the substrates. The macroscopic region might be the outside perimeter, thereby automatically achieving an edge seal of the display during polymerization. The spacer elements may be porous structures, and the accelerator or photoinitiator is then allowed to absorb into the porous matrix in order to increase the weight percent of accelerator or photoinitiator in the desired localized region as well as to better provide better interpenetration of the polymer and spacing, thus providing better adhesion. The spacer elements may be composed of glass, typically in the form of beads or rods, which are then etched to increase the surface area for improved adhesion. One or more layers of a an adhesion promoter such as a silane coupling agent may be coated onto the glass spacers which may or may not have been etched, prior to the coating of the glass spacers with the accelerator or photoinitiator. The spacer elements may be admixed to the photoinitiator or accelerator in concentrations higher than what would be desired in regions of the display that are active image areas; the mixture is then deposited onto the substrate via printing or pipette methods into the interpixel regions or the perimeter where no image is presented, thus provided additional support without adversely affecting the image contrast or quality. The initiator may be solely heat activated or heat activated as well as photo-activated or other activation method. The polymer is chosen so as to contract following initial bonding to the substrates and upon curing; the two substrates are thus drawn together, increasing durability of the display; this is particularly effective when the polymer is localized around the spacer element, as has been previously described. The spacer element may be one or more sheets of an extensible porous membrane that when laminated in between the substrates is the element that determines the spacing between the substrates. In this and other embodiments, one or more of the substrates may be of glass or other rigid material.

Other embodiments of the invention are within the following claims.

What is claimed is:

1. A liquid crystal display device, comprising:
   two substrates facing and spaced from each other, at least one of the substrates being transparent;
   electrodes positioned to establish an electric field in the space between the two substrates;
   one or more space elements located between the substrates;
   one or more polymer supports located primarily in the vicinities of the spacer elements, the polymer supports extending between the two substrates and having been polymerized in situ in response to PIE material carried on or within the spacer elements; and
   electrooptic material filling at least a portion of the space between the two substrates.

2. The liquid crystal display device of claim 1 wherein the spacer elements comprise a large number of generally spherical or cylindrical elements.

3. The liquid crystal display device of claim 2 wherein the spacer elements comprise glass.

4. The liquid crystal display device of claim 3 wherein the glass is etched and the PIE material adheres to the etched glass surface.

5. The liquid crystal display device of claim 2 wherein the spacer elements comprise plastic.

6. The liquid crystal display device of claim 5 wherein the plastic is porous and the PIE material is absorbed into the porous structure.

7. The liquid crystal display device of claim 2 wherein the spacer elements comprise high-surface area particles that are nanoporous, mesoporous, or microporous.

8. The liquid crystal display device of claim 2 wherein the spacer elements are randomly located in the space between the substrates.

9. The liquid crystal display device of claim 1 wherein the majority of the polymer supports are bonded to each of the two substrates.

10. The liquid crystal display device of claim 1 wherein the polymer support generally surrounds the exterior of the spacer element.

11. The liquid crystal display device of claim 1 wherein the polymer supports are primarily separate members not interconnected with one another.

12. The liquid crystal display device of claim 1 wherein one or more interconnecting regions of polymer interconnects a majority of the polymer supports.

13. The liquid crystal display device of claim 12 wherein one of the interconnecting regions comprises a layer of polymer adjacent one of the substrates.

14. The liquid crystal display device of claim 1 wherein the PIE material is applied to the spacer elements before introduction of the spacer elements to the space between the substrates.

15. The liquid crystal display device of claim 1 wherein the PIE material is applied to the spacer elements after introduction of the spacer elements to the space between the substrates.

16. The liquid crystal display device of claim 1 wherein the PIE material is a coating applied to the spacer elements.

17. The liquid crystal display device of claim 1 wherein the spacer elements are dry sprayed on to the substrate before application of the electrooptic material.

18. The liquid crystal display device of claim 1 wherein the spacer elements are wet sprayed on to the substrate.

19. The liquid crystal display device of claim 18 wherein a solvent used for wet spraying comprises a PIE material or has a PIE material in solution or suspension.

20. The liquid crystal display device of claim 1 wherein the PIE material comprises one or both of the following: an initiator and an accelerant of the in situ polymerization process.

21. The liquid crystal display device of claim 20 wherein the PIE material is light activated.

22. The liquid crystal display device of claim 21 wherein the PIE material comprises a photoinitiator.

23. The liquid crystal display device of claim 22 wherein the photoinitiator comprises a plurality of photoinitiators of different spectral sensitivities, so that polymerization may be initiated at different times in different locations.

24. The liquid crystal display device of claim 21 or 22 wherein the light is ultraviolet light.

25. The liquid crystal display device of claim 20 wherein the PIE material is heat activated.

26. The liquid crystal display device of claim 20 wherein the PIE material is self-activated after a period of time following assembly of the display.

27. The liquid crystal display device of claim 20 wherein the PIE material comprises both a photoinitiator and an accelerant.

28. The liquid crystal display device of claim 1 wherein the electrooptic material and a prepolymer are applied between the substrates as a mixture, and during in situ polymerization a phase separation of the electrooptic material and the polymer occurs.

29. The liquid crystal display device of claim 1 or 28 wherein the electrooptic material is a liquid crystal material.

30. The liquid crystal device of claim 1 or 28 wherein the electrooptic material is a mesomorphic material.

31. The liquid crystal display of claim 1 further comprising at least one electrode on at least one substrate to generate the electric field.

32. The liquid crystal display device of claim 31 further comprising at least one electrode on the second substrate.

33. The liquid crystal display device of claim 1 wherein the polymer used for in situ polymerization of the substrates comprises an acrylic based adhesive.

34. The liquid crystal display device of claim 1 wherein the polymer used for in situ polymerization of the substrates comprises an epoxy-based adhesive.

35. The liquid crystal display device of claim 1 wherein the polymer used for in situ polymerization of the substrates comprises a urethane-based adhesive.

36. The liquid crystal display device of claim 1 wherein the polymer used is primarily cured by light.

37. The liquid crystal display device of claim 1 wherein the polymer used is primarily cured by heat.

38. The liquid crystal display device of claim 1 wherein the polymer used is primarily cured via intermixing of a chemical additive.

39. The liquid crystal device of claim 1 wherein the substrates comprise a flexible polymer material.

* * * * *

UNITED STATES PATENT AND TRADEMARK OFFICE
CERTIFICATE OF CORRECTION

PATENT NO.    : 6,606,142 B2
DATED         : August 12, 2003
INVENTOR(S)   : Gary A. Freeman It is certified that error appears in the above-identified patent and that said Letters Patent is hereby corrected as shown below:

Column 2,
Line 2, before "high", insert -- have --.

Column 3,
Line 48, before "absorbed", insert -- be --.

Column 5,
Line 10, "a" should be -- an --.

Column 6,
Line 37, after "using", delete "the".

Column 8,
Line 19, "Tthe" should be -- The --.
Line 44, after "of", delete "a".
Line 53, "provided" should be -- providing --.

Column 9,
Line 10, after "substrates", insert -- extending substantially the distance between the substrates; --.

Signed and Sealed this

Ninth Day of March, 2004

JON W. DUDAS
*Acting Director of the United States Patent and Trademark Office*